United States Patent Office 3,153,255
Patented Oct. 20, 1964

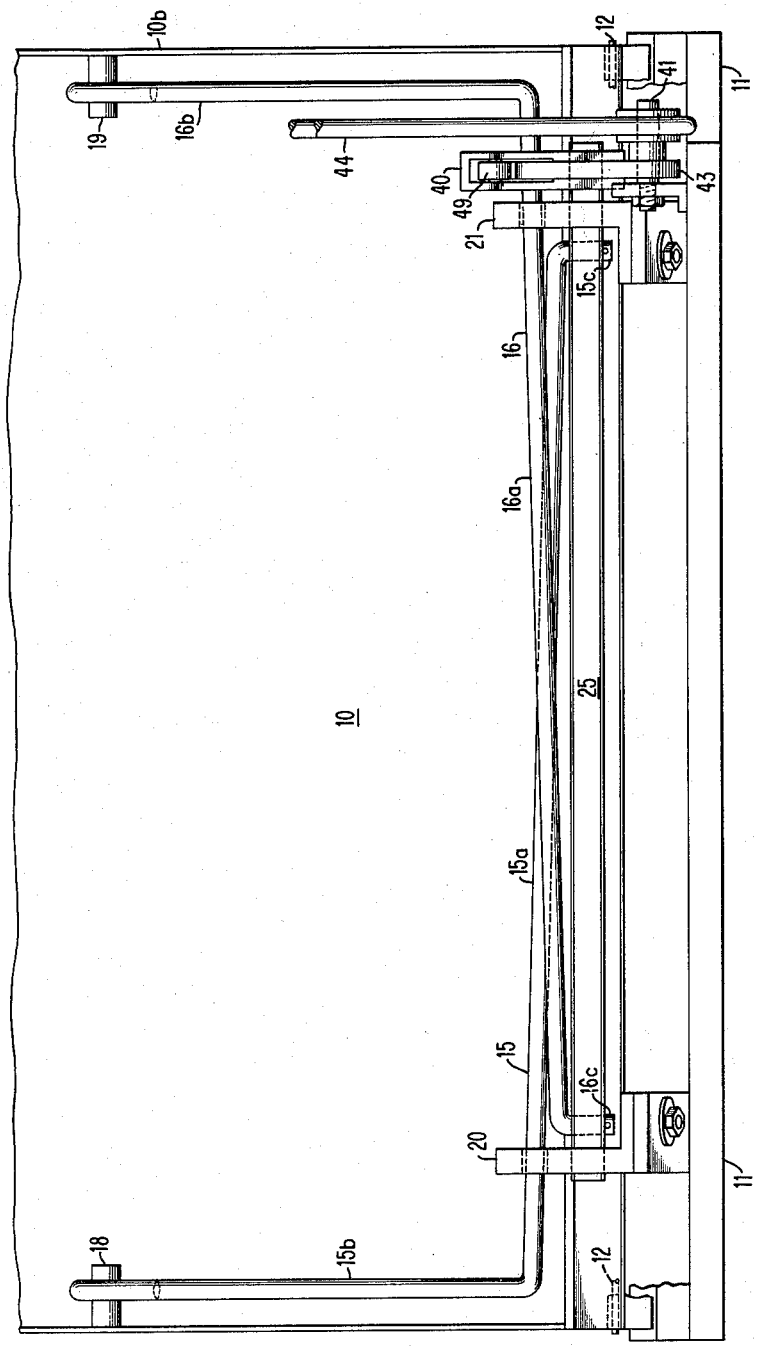

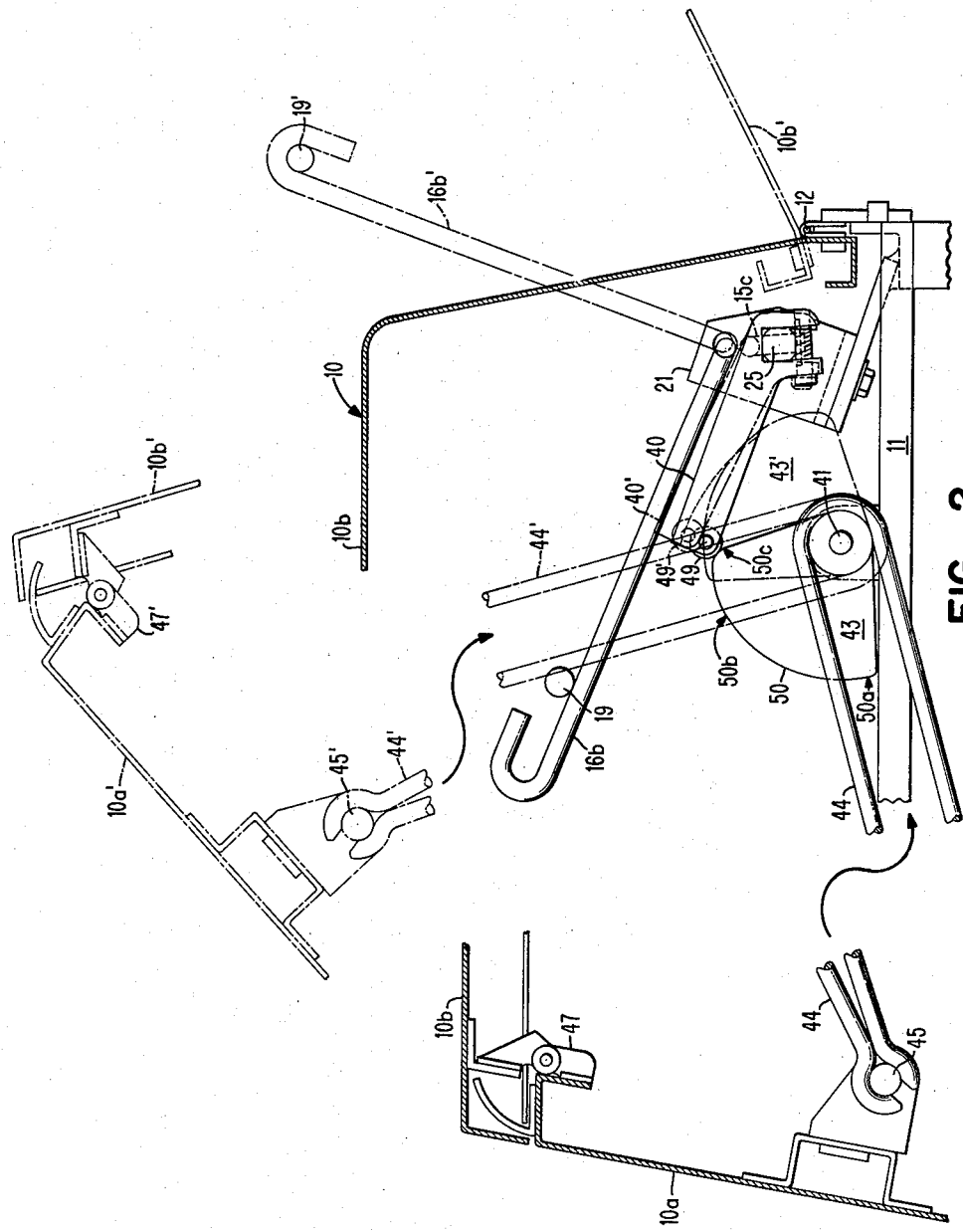

3,153,255
TORSION ROD COVER SUPPORT
Kenneth V. Bostwick, Endicott, N.Y., assignor to International Business Machines Corporation, New York, N.Y., a corporation of New York
Filed Apr. 17, 1962, Ser. No. 188,067
6 Claims. (Cl. 16—1)

This invention relates to a support assembly for a closure member and more particularly to a torsion rod support assembly capable of providing a variable counterforce to a closure member.

In conventional torsion rod support assemblies the torsion rod experiences the greatest angle of twist when the closure member has been rotated from the open position to the closed position. Therefore the greatest counterforce exerted upon the closure member occurs when the closure member is in the closed position. It becomes necessary then to provide a latch or other means for maintaining the closure member in the closed position against the force of the torsion rod.

Accordingly, it is an object of this invention to provide a support assembly capable of overcoming the effect of the counterforce of the torsion rod as the closure member approaches the closed position.

It is another object of the present invention to provide a support assembly capable of changing the direction of the torsion rod force as the closure member approaches the closed position thereby drawing the closure member into the closed position.

Where the closure member is rotated from an open vertical position to a closed horizontal position, the weight of the cover upon the torsion rods varies with the position of the cover. Difficulty is encountered in designing the counterforce of the torsion rod to be equal to the weight of the cover at all normally open positions, so that the cover can be held in any open position.

It is an additional object of this invention to provide a support assembly which is capable of providing a counterforce for holding a closure member in any normally open position.

It is a further object of this invention to provide a support assembly capable of accomplishing the above objects without appreciably obstructing the storage space beneath the cover.

This invention is applied to a cover which is resisted in its movement toward the closed position by torsion rod means. In accordance with the invention, the torsion rod means includes a cam follower bearing against the surface of a cam. The cam has a uniquely contoured surface. One portion of the surface describes a circular arc about the pivot point of the cam. Therefore when a cam follower bears against this surface, the force acting normal to the surface passes through the pivot point of the cam thereby producing no moment about the pivot point. A second portion of the cam has a radius of curvature smaller than the first surface so that a force acting normal to the second surface does not pass through the pivot point of the cam and produces a moment about the pivot point of the cam. In this manner the counterforce of the torsion rod can be diverted into a moment about the pivot point of the cam, this moment being utilized to pull the cover into a closed position.

The foregoing and other objects, features and advantages of the invention will be apparent from the following more particular description of the preferred embodiment of the invention, as illustrated in the accompanying drawings.

In the drawings:

FIG. 1 is a front elevation of an open cover and a support assembly therefore, embodying the present invention;

FIG. 2 is a side elevation of the structure shown in FIG. 1, this view being taken looking in the direction of the arrow 2 of FIG. 1.

In FIGS. 1 and 2 the cover 10 is shown pivotally mounted upon the fixed support 11 by means of a pin 12. FIG. 1 shows cover 10 in the vertical or open position. In FIG. 2 the full line drawing shows cover 10 in the closed or horizontal position. The cover includes a front portion 10a and a top portion 10b. The broken line drawing shows cover 10 in the vertical or open position.

Torsion rods 15 and 16 have their longitudinal portions 15a and 16a respectively aligned substantially parallel to the pin 12. The crank end 15b of the torsion rod 15 is connected to the cover 10 through stud 18 located at the left end of the cover 10. The crank end 16b of the torsion rod 16 is connected to the cover 10 by the stud 19 located at the right end of the cover 10.

The bracket 20 is mounted upon the fixed support 11, and torsion rod 15 extends through a hole in bracket 20. The bracket 21 is mounted upon fixed support 11, and torsion rod 16 extends through a hole in bracket 21. A bar 25 extends through holes in brackets 20 and 21. The right end 15c of torsion rod 15 is anchored into a hole in the right end of bar 25. The left end 16c of torsion rod 16 is anchored into a hole in the left end of bar 25. When cover 10 is rotated from the open position shown in FIG. 1, toward the horizontal position, crank ends 15b and 16b twist their respective longitudinal sections 15a and 16a causing anchor ends 15c and 16c to tend to rotate bar 25.

Mounted on the right end of bar 25 is a follower arm 40. A pintle 41 is mounted on the fixed support 11. Cam 43 is pivotally mounted on the pintle 41. A connecting arm 44 is fastened to the cam 43 and connected to the cover through stud 45. When the cover is rotated about pin 12, the connecting arm 44 causes cam 43 to rotate about the pintle 41 in the same angular direction as the cover 10.

The front portion of the cover 10a is connected to a top portion 10b by means of the hinge 47. Since the front portion 10a is connected to the arm 44, it rotates about the pintle 41. The top portion 10b rotates about the pin 12. The hinge 47 compensates for the two different rotation points of the cover 10. As shown in FIG. 2, the top 10b and front 10a form an acute angle when the cover is in the open position, and an obtuse angle when in the closed position.

A roller 49 is mounted on the end of the follower arm 40. The roller 49 makes contact with the surface 50 of cam 43 and rolls along the surface 50 as the cam 43 rotates. The contour of the surface 50 is designed so that the portion of the surface between locations 50a and 50b describes a circular arc centered about the pintle 41. The portion of the surface 50 between the locations 50b and 50c is designed so that the radius of curvature is smaller than the radius of curvature of the surface portion between 50a and 50b. The radius of curvature of the surface decreases along the path from 50b to 50c. Forces exerted by the roller 49 upon the surface 50 act normal to the surface at the point of contact. Therefore when the roller 49 is in contact with the surface portion between 50a and 50b the roller force acts through the pintle 41, producing no moment about the pintle 41. When the roller 49 is in contact with the portion of the surface between 50b and 50c the force of the roller acts to the left of the pintle 41 producing a counterclockwise moment about the pintle 41.

When the cover 10 is in the vertical position as shown in broken line, FIG. 2, the torsion bars 15 and 16 are relaxed having little twisting force imparted to their longitudinal portions 15a and 16a. In this position, the connecting arm 44 brings the surface 50 between the locations 50a and 50b into contact with the roller 49. As the cover is rotated from the vertical position toward the horizontal position the torsion bars 15 and 16 bias the roller 49 against the surface 50 with increasing force. Also, the connecting arm 44 rotates the cam 43 causing the portion of surface 50 between 50a and 50b to move beneath the roller 49. During this time the follower arm 40 remains stationary and the anchor ends 15c and 16c also remain stationary. Therefore as the weight of the cover 10 upon the crank ends 15b and 16b increases due to the rotation away from the vertical position, the counterbalancing force of the torsion rods 15 and 16 also increases due to the twistng action of the longitudinal portions 15a and 16a.

When the cover has rotated from the vertical position to the point where roller 49 is in contact with the cam surface 50 at location 50b, the counterbalancing force of the torsion rods 15 and 16 begins to overcome the weight of the cover 10 acting upon the crank ends 15b and 16b. As the cam 43 continues to rotate in the counterclockwise direction, the surface 50 begins to drop away from the roller 49 causing the follower arm to rotate in a counterclockwise direction relaxing the torsion rods 15 and 16, thereby reducing the counterbalancing force exerted upon the cover 10.

The effect of the counterbalancing force is reduced in a separate and distinct manner from the one just described. When the roller 49 is in contact with the portion of the surface between locations 50b and 50c, the force exerted by the roller 49 produces a counterclockwise moment about the pintle 41. This moment causes the connecting arm 44 to pull the cover 10 down, thereby acting to overcome the counterbalancing force of the torsion rods 15 and 16.

The new moment about the pintle 41 creates a reactionary force upon the roller 49 which is transmitted through the follower arm 40 to the bracket 21. When the cover approaches the closed position, the bracket experiences a new component of force in the horizontal direction away from the cam 43. The bracket acts as the foundation for the moment about pintle 41.

Various modifications of the structure shown in FIGS. 1 and 2 can be made within the scope of the invention. For example, the torsion rod 16 and bar 25 can be eliminated by fastening the anchor end 15c to the follower arm 40 by any conventional means, such as a pin-like member extending through the hole in the bracket 21.

Another apparent alteration of the illustrated embodiment of this invention could be made by replacing the follower arm 40 and roller 49 with any conventional cam follower means which contacts the surface 50 at a single point. In some applications of this invention the anchor arm 15c could be extended outwardly from the longitudinal portion 15a so as to make contact with the surface 50 of the cam 43, thereby effectively using the anchor 15c as a cam follower means.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A support assembly for a closure member pivotally mounted on a fixed support for rotation between open and closed positions, comprising:
   a fixed support for supporting said closure member;
   a cam pivotally mounted on said fixed support;
   a cam follower pivotally mounted on said fixed support adjacent to said cam;
   a connecting arm having one end secured to said cam and the other end connected to said closure member for rotating said cam with said closure member;
   and a torsion rod having a longitudinally extending axis arranged substantially parallel to the pivotal axis of said closure member, a crank end connected to said closure member and another end fixed to said cam follower for biasing said follower in the direction of said cam in response to rotation of said closure member, said cam having a first surface portion describing a circular arc about the pivotal axis of said cam and engaged with said follower when said closure member is in the open position, and a second surface portion adjacent to said first surface having a radius of curvature progressively smaller than the radius of curvature of said first surface and engaged with said cam follower when the closure member approaches the closed position, so that said cam follower engaging said second surface creates a moment about the pivotal axis of said cam causing said connecting arm to pull said closure member into the closed position.

2. A support assembly for a closure member pivotally mounted on a fixed support for rotation between open and closed positions, comprising:
   a fixed support for supporting said closure member;
   a pintle mounted on said fixed support;
   a cam pivotally mounted on said pintle;
   a cam follower pivotally mounted on said fixed support adjacent to said cam;
   a connecting arm having one end secured to said cam and the other end connected to said closure member for rotating said cam with said closure member;
   and a torsion rod having a longitudinally extending axis arranged substantially parallel to the pivotal axis of said closure member, a crank end connected to said closure member and another end fixed to said cam follower for biasing said follower in the direction of said cam in response to rotation of said closure member, said cam having a first surface portion describing a circular arc about said pintle and engaged with said follower when said closure member is in the open position, and a second surface portion adjacent to said first surface having a radius of curvature progressively smaller than the radius of curvature of said first surface and engaged with said cam follower when the closure member approaches the closed position, so that said cam follower engaging said second surface creates a moment about said pintle causing said connecting arm to pull said closure member into the closed position, and said cam follower engaging said first surface acts through said pintle creating no moment about said pintle.

3. A support assembly for a closure member pivotally mounted on a fixed support for rotation between open and closed positions, comprising:
   a fixed support for supporting said closure member; a pintle mounted on said fixed support so that its longitudinal axis is substantially parallel to the pivotal axis of said closure member;
   a cam pivotally mounted on said pintle;
   a bracket mounted upon said fixed support between the longitudinal axis of said pintle and the pivotal axis of said closure member;
   a cam follower pivotally mounted on said bracket adjacent to said cam;
   a connecting arm having one end secured to said cam and the other end connected to said closure member for rotating said cam with said closure member;
   and a torsion rod having a longitudinally extending axis arranged substantially parallel to the pivotal axis of said closure member, a crank end connected to said closure member and another end fixed to said cam follower for biasing said follower in the direction of said cam in response to rotation of said closure member, said cam having a first surface portion describing a circular arc about said pintle and engaged with said follower when said closure member is in the open position, and a second surface portion adjacent to said first surface having a radius of curvature progressively smaller than the radius of curvature of said first surface and engaged with said cam follower when the closure member approaches the closed position, so that said cam follower engaging said second surface creates a moment about said pintle causing said connecting arm to pull said closure member into the closed position, and said cam follower engaging said first surface acts through said pintle creating no moment about said pintle.

4. A support assembly for a closure member, comprising:
   a substantially horizontal fixed support for supporting said closure member;
   a hinge mounted on said fixed support and connected to said closure member for rotating said closure member about a horizontal axis between substantially vertical and substantially horizontal positions;
   a pintle mounted on said fixed support so that its longitudinal axis is substantially parallel to the pivotal axis of said closure member and located under said closure member when the latter is in the horizontal position;
   a cam pivotally mounted on said pintle;
   a bracket mounted on said fixed support between the longitudinal axis of said pintle and the pivotal axis of said closure member;
   a cam follower pivotally mounted on said bracket adjacent to said cam;
   a connecting arm having one end secured to said cam and the other end connected to said closure member for rotating said cam with said closure member;
   and a torsion rod having a longitudinally extending axis arranged substantially parallel to the pivotal axis of said closure member, a crank end connected to said closure member and another end fixed to said cam follower for biasing said follower in the direction of said cam in response to rotation of said closure member, said cam having a first surface portion describing a circular arc about said pintle and engaged with said follower when the closure member is in the area of the vertical position, and a second surface portion adjacent to said first surface portion having a radius of curvature progressively smaller than the radius of curvature of said first surface and engaged with said follower when the closure member approaches the horizontal position, so that said follower engaging said second surface creates a moment about said pintle causing said connecting arm to pull said closure member into the horizontal position, and said cam follower engaging said first surface acts through said pintle creating no moment about said pintle.

5. A support assembly for a closure member comprising:
   a substantially horizontal fixed support for supporting said closure member;
   a hinge mounted on said fixed support and connected to said closure member for rotating said closure member about a horizontal axis between substantially vertical and substantially horizontal positions;
   a pintle mounted on said fixed support so that its longitudinal axis is substantially parallel to the pivotal axis of said closure member and located under said closure member when the latter is in the horizontal position;
   a cam pivotally mounted on said pintle;
   a first and a second bracket each mounted upon said fixed support between the longitudinal axis of said pintle and the pivotal axis of said closure member, each bracket having a bore located along a common axis substantially parallel to the pivotal axis of said closure member;
   a bar extending through the bore of each bracket;
   a cam follower arm secured to said bar;
   a roller mounted on said cam follower adjacent to said cam;
   a connecting arm having one end secured to said cam and the other end connected to said closure member for rotating said cam with said closure member in the same angular direction;
   and a first and a second torsion rod each having a longitudinally extending axis arranged substantially parallel to the pivotal axis of said closure member, said first rod having a crank end connected to one end portion of said closure member and said second rod having a crank end connected to the other end portion of said closure member, said first rod having another end anchored into one end of said bar and said second rod having another end anchored into the opposite end of said bar for biasing said roller in the direction of said cam in response to rotation of said closure member, said cam having a first surface portion describing a circular arc about said pintle and engaged with said roller when the closure member is in the area of the vertical position, and a second surface portion adjacent to said first surface portion having a radius of curvature progressively smaller than the radius of curvature of said first surface and engaged with said roller when the closure member approaches the horizontal position, so that of said roller engaging said second surface creates a moment about said pintle in the same angular direction in which said cam rotates when said closure member rotates toward the horizontal position, said moment causing said connecting arm to pull said closure member into the horizontal position, and said roller engaging said first surface acts through said pintle creating no moment about said pintle.

6. A support assembly for a closure member pivotally mounted on a fixed support for rotation between open and closed positions, comprising:
   a fixed support for supporting said closure member;
   a cam pivotally mounted on said fixed support;
   a cam follower in continuous contact with said cam;
   a connecting arm having one end secured to said cam and the other end connected to said closure member for rotating said cam with said closure member;
   and a torsion rod having a longitudinally extending axis arranged substantially parallel to the pivotal axis of said closure member, a crank region of said torsion rod connected to said closure member and another region of said torsion rod joining said cam follower for biasing said follower in the direction of said cam in response to rotation of said closure member, said cam having a first surface portion describing a circular arc about the pivotal axis of said cam and engaged with said follower when said closure member is in the open position, and a second surface portion adjacent to said first surface having a radius of curvature progressively smaller than the radius of curvature of said first surface and engaged with said follower when the closure member approaches the closed position, so that said cam follower engaging said second surface creates a moment about the pivotal axis of said cam causing said connecting arm to pull said closure member into the closed position.

References Cited in the file of this patent
UNITED STATES PATENTS

| | | |
|---|---|---|
| 776,892 | Dahlund | Dec. 6, 1904 |
| 823,372 | Stevens et al. | June 12, 1906 |
| 2,602,957 | Anderson | July 15, 1952 |
| 2,707,799 | Butterfield | May 10, 1955 |
| 2,895,161 | Badura | July 21, 1959 |
| 3,067,453 | Lyons | Dec. 11, 1962 |